(12) United States Patent
Urbano et al.

(10) Patent No.: US 9,103,565 B2
(45) Date of Patent: Aug. 11, 2015

(54) SOLAR COLLECTORS RECEIVER TUBES

(75) Inventors: Marco Urbano, Milan (IT); Gianni Santella, Tornimparte (IT); Luca Viale, Cavenago di Brianza (IT); Andrea Conte, Milan (IT)

(73) Assignee: SAES GETTERS S.P.A., Lainate (IT)

( * ) Notice: Subject to any disclaimer, the term of this patent is extended or adjusted under 35 U.S.C. 154(b) by 0 days.

(21) Appl. No.: 14/236,173

(22) PCT Filed: Jul. 31, 2012

(86) PCT No.: PCT/IB2012/053908
§ 371 (c)(1),
(2), (4) Date: Jan. 30, 2014

(87) PCT Pub. No.: WO2013/018033
PCT Pub. Date: Feb. 7, 2013

(65) Prior Publication Data
US 2014/0158113 A1    Jun. 12, 2014

(30) Foreign Application Priority Data

Aug. 4, 2011   (IT) .............................. MI2011A1492

(51) Int. Cl.
F24J 2/24        (2006.01)
F24J 2/05        (2006.01)
F24J 2/46        (2006.01)

(52) U.S. Cl.
CPC .. F24J 2/05 (2013.01); F24J 2/055 (2013.01); F24J 2/4612 (2013.01); F24J 2/4616 (2013.01); Y02E 10/44 (2013.01)

(58) Field of Classification Search
CPC ............... F24J 2/055; F24J 2/05; Y02E 10/44
USPC ......................................... 126/653, 654, 655
See application file for complete search history.

(56) References Cited

U.S. PATENT DOCUMENTS

| | | | |
|---|---|---|---|
| 3,203,901 A | | 8/1965 | Della Porta |
| 3,858,646 A | * | 1/1975 | Naylor ........................... 165/145 |
| 4,306,887 A | * | 12/1981 | Barosi et al. ..................... 95/116 |
| 5,961,750 A | | 10/1999 | Boffito et al. |
| 5,992,787 A | * | 11/1999 | Burke ......................... 242/388.1 |
| 6,013,195 A | * | 1/2000 | Corazza et al. ............. 252/181.1 |
| 6,832,608 B2 | * | 12/2004 | Barkai et al. .................. 126/653 |
| 7,810,491 B2 | * | 10/2010 | Benvenuti ...................... 126/653 |
| 2004/0134484 A1 | * | 7/2004 | Barkai et al. .................. 126/653 |
| 2010/0126499 A1 | * | 5/2010 | Lu .................................. 126/651 |

(Continued)

FOREIGN PATENT DOCUMENTS

| | | | |
|---|---|---|---|
| DE | 102009045100 | | 4/2011 |
| EP | 2581684 | * | 9/2010 |

(Continued)

OTHER PUBLICATIONS

International Search Report mailed on Oct. 24, 2012 for PCT/IT2012/053908 filed on Jul. 31, 2012 in the name of SAES Getters S.P.A.

(Continued)

*Primary Examiner* — Avinash Savani
*Assistant Examiner* — George R Blum
(74) *Attorney, Agent, or Firm* — Steinfl & Bruno LLP

(57) ABSTRACT

Solar connector receiver tubes with getter systems having a substantially toroidal shape are described.

21 Claims, 7 Drawing Sheets

(56) References Cited

U.S. PATENT DOCUMENTS

Figure 1:
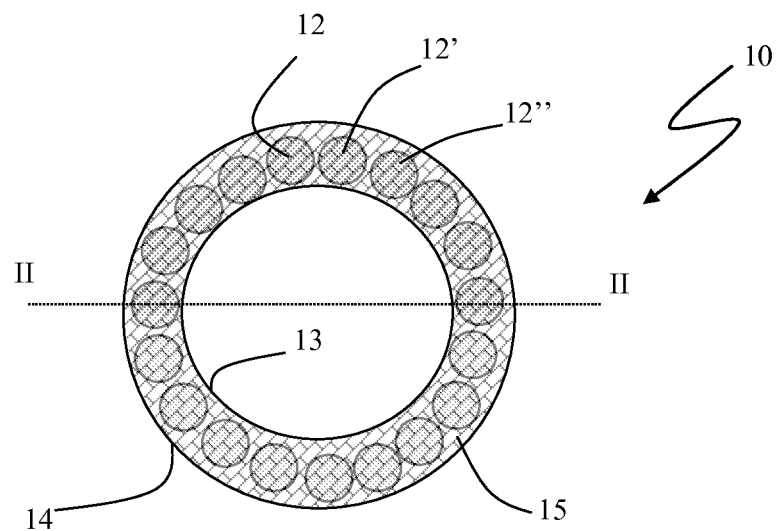

| | | | |
|---|---|---|---|
| 2012/0020862 A1* | 1/2012 | Coda et al. | 423/248 |
| 2012/0186576 A1* | 7/2012 | Kuckelkorn et al. | 126/653 |
| 2012/0211003 A1* | 8/2012 | Kuckelkorn | 126/653 |
| 2012/0247456 A1* | 10/2012 | Martinez Sanz et al. | 126/653 |
| 2012/0251336 A1* | 10/2012 | Martinez Sanz et al. | 417/48 |
| 2013/0025585 A1* | 1/2013 | Conte et al. | 126/651 |
| 2013/0125874 A1* | 5/2013 | Conte et al. | 126/653 |
| 2013/0220308 A1* | 8/2013 | Nunez Bootello et al. | 126/653 |

FOREIGN PATENT DOCUMENTS

| | | | |
|---|---|---|---|
| EP | 2581684 A2 | * | 9/2010 |
| EP | 2 325 575 | | 5/2011 |
| EP | 2325575 | * | 5/2011 |
| GB | 2077487 | | 12/1981 |
| WO | 2007/099575 | | 9/2007 |
| WO | 2007/148362 | | 12/2007 |
| WO | 2010/105945 | | 9/2010 |
| WO | 2010/144930 | | 12/2010 |
| WO | 2011/039281 | | 4/2011 |
| WO | 2011/042578 | | 4/2011 |
| WO | WO 2011042578 A1 | * | 4/2011 |

OTHER PUBLICATIONS

Written Opinion mailed on Oct. 24, 2012 for PCT/IT2012/053908 filed on Jul. 31, 2012 in the name of SAES Getters S.P.A.

International Preliminary Report on Patentability mailed on Aug. 19, 2013 for PCT/IT2012/053908 filed on Jul. 31, 2012 in the name of SAES Getters S.P.A.

* cited by examiner

SOLAR COLLECTORS RECEIVER TUBES

CROSS REFERENCE TO RELATED APPLICATIONS

The present application is the US national stage of International Patent Application PCT/IB2012/053908 filed on Jul. 31, 2012 which, in turn, claims priority to Italian Patent Application MI2011A001492filed on Aug. 4, 2011.

The present invention relates to improvements for solar collectors receiver tubes, particularly to a getter system to control the hydrogen quantity in a plant that employs receiver tubes connected in series among each other.

Solar collector are becoming an alternative energy source of growing importance. One of the problems with these collectors is linked to the presence of hydrogen, also at low levels. As a matter of fact, in solar collector receiver tubes the hydrogen presence is detrimental since it increases the thermal conductivity from the tubular central body, wherein a heat removing fluid flows, toward the outside of the receiver tube, thereby progressively diminishing its efficiency. In some types of receiver tubes, such as the ones using diathermic oils, the problems linked to hydrogen presence are of particular relevance since the fluid flowing in the central body tends to decompose at high temperatures, generating hydrogen.

Also in the new generations of receiver tubes, that employ a different type of fluid to remove heat at higher temperatures, the problem linked to the hydrogen presence and the consequent deterioration of the device characteristics is of particular relevance, since at such temperatures there is a higher hydrogen outgassing from the receiver metallic parts.

An additional problem inside solar collector receiver tubes is also correlated to the correct positioning of the getter material and to the means employed for its housing, i.e. to the getter system and how it interacts with the other components of the solar collector receiver tube.

In particular there are three different problematic aspects linked to the operating receiver tube temperature and to the getter material temperature within the getter system.

On one side the getter material temperature in operating conditions should not be excessively high, ideally being comprised between 200 and 400° C., since at higher temperatures there is a marked worsening in the system capacity to absorb hydrogen; on the other side at lower temperatures there is a deterioration of the getter system capacity to remove other gases present in the system such as $N_2$, $O_2$, CO, $CO_2$ and hydrocarbons. Indeed, even though hydrogen is the most detrimental gaseous species for the receiver tube, also the accumulation of other gaseous species causes its progressive decay.

In a second aspect the temperature plays a very important role also during the conditioning and degassing phase of the solar collector receiver tube. In this case one of the most common degassing methods envisions the receiver tube heating by means of internal electrical resistances, via current flow or oven heating, with maximum temperatures depending both on the receiver tube type (diathermic oil or fused salts) and on the thermo-mechanical resistance of the glass-metal joint. It is fundamental that during this phase there is also the activation of the getter system, that consequently shall be thought in such a way to bring the material therein contained to temperatures higher than 300° C.

A third aspect, of lesser relevance with respect to the two aforementioned ones but capable of significantly impacting the getter system functionality inside the receiver tubes is linked to the fact that the solar collector plants envision the use of a plurality of elements, connected in series. In particular in a typical plant there are between 100 and 150 receiver tubes connected in series, with each receiver tube having a length of approximately 4 meters. The number of elements can vary in a significant manner in dependence of various parameters, such as their geographical location, that also determine restraints on the number of elements to connect in series. As a matter of fact, the heat removing fluid is relatively cold in the earlier elements, but its temperature progressively increases up to the final element where the fluid, that has reached the highest temperature, exits to go into the thermal exchangers. So the optimal number of elements in a plant is determined by the balance to obtain a temperature sufficiently high to achieve an efficient thermal exchange but not excessively high to avoid to compromise the structural integrity of the system, for example by bringing the heat removing fluid to an excessive temperature, causing its deterioration; the maximum temperature in the case of oils is around 400° C., while in the case of salts is about 550° C. Higher temperatures would also lead to an excessive outgassing that would quickly degrade the vacuum conditions inside the elements nearby the exit. In this regard, in the technical field, the typical vacuum level required to ensure an efficient thermal insulation is equal to or less than $10^{-4}$ mbar.

The problems and constrains linked to the temperatures require some specific solutions that may differ according to the type of receiver tube. More specifically, in the following, reference will be made to high working temperature receiver tubes for those tubes that may reach temperatures higher than 450° C., such as the one using molten salts, while with the term receiver tubes that operate at moderate working temperatures, to tubes whose working temperatures do not exceed 450° C., such as receiver tubes using diathermic oils as cooling fluid.

Therefore ideally the getter system should interact with a receiver tube in a slightly different way depending on the position of the receiver tube in the sequence constituting the plant, since a solution capable of overcoming this problem would improve the overall efficiency of the plant.

The solutions known in the art are not capable to address all these aspects at the same time. For example, U.S. Pat. No. 6,832,608 shows a getter system in form of a sledge containing getter material pills, thus focusing solely on the aspects related to the excessive temperature of the material, since the technical function of the sledge is to shield the getter material from the solar radiation and from the portions of the collector at the highest temperature.

A similar problem is also tagged in the International patent application WO 2011/039281, describing various geometries and solutions whose purpose is the shielding of the getter material from the incoming concentrated solar radiation.

Purpose of the present invention is to overcome the problems still present in the known art, with a solution capable to address the issues related to the correct temperature of the getter material in a solar collector receiver tube. Said purpose is achieved with a solar collector receiver tube containing a central tubular element wherein a heat removal fluid flows, an external tubular element that acts as an envelope, an element with variable length for the compensation of the different thermal expansion of the two tubular elements, and a getter system comprising a container that houses compressed cylindrical pills of getter material, characterized in that the container has a substantially toroidal shape and said container is arranged around the central tubular element, the cross-section of the container having a width comprised between 1,05*i and 1,2*i, wherein i represents the lateral encumbrance of the getter material pills.

With lateral encumbrance it is intended the encumbrance of the getter material pills with respect to the width of the cross-section of the toroidal container, i.e. the lateral overall dimension of the cylindrical getter material pills in the container cross-section.

Figure 2:
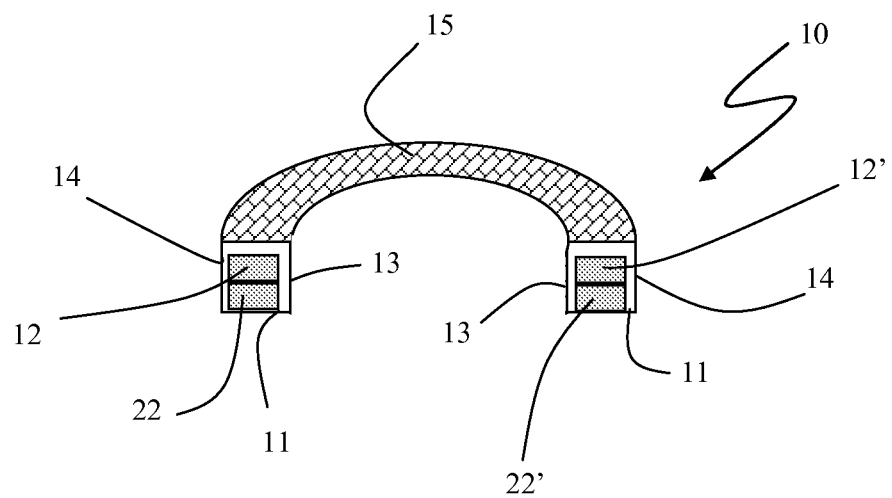
Figure 3:
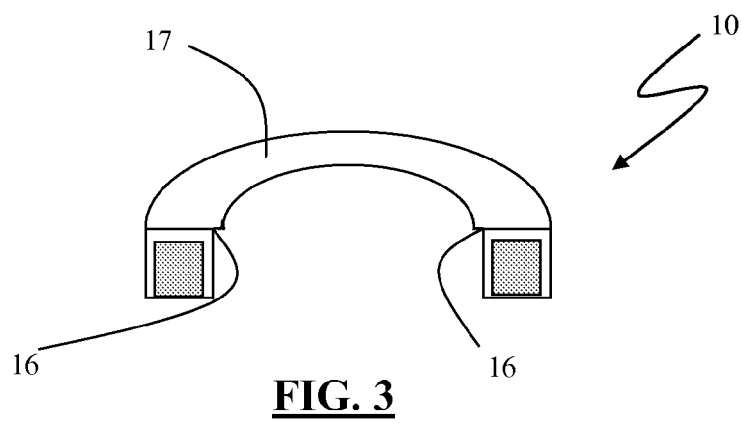
Figure 4:
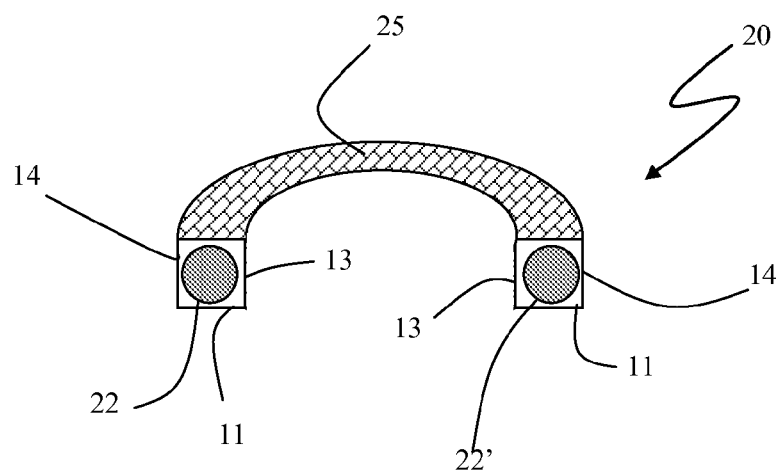
Figure 5:
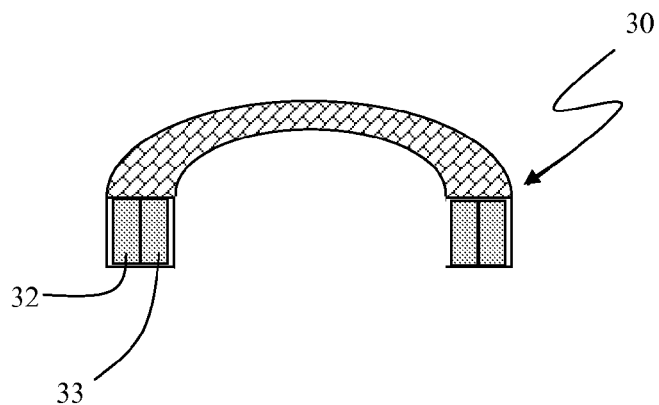
Figure 6:
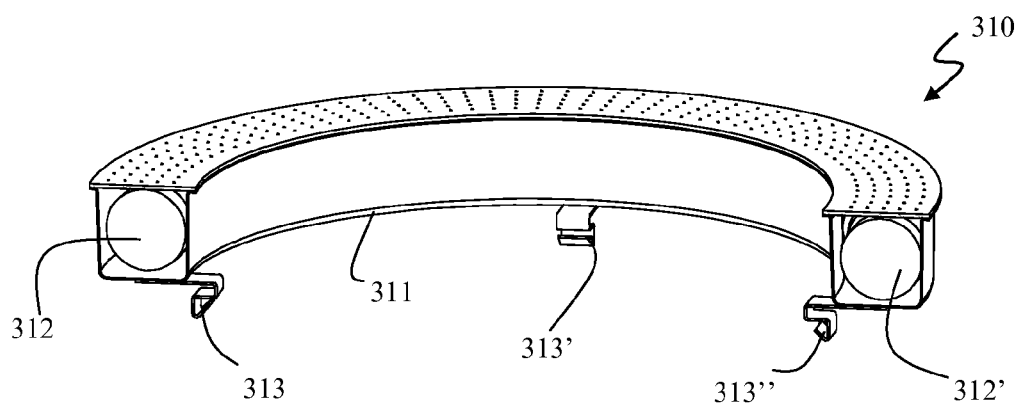
Figure 7:
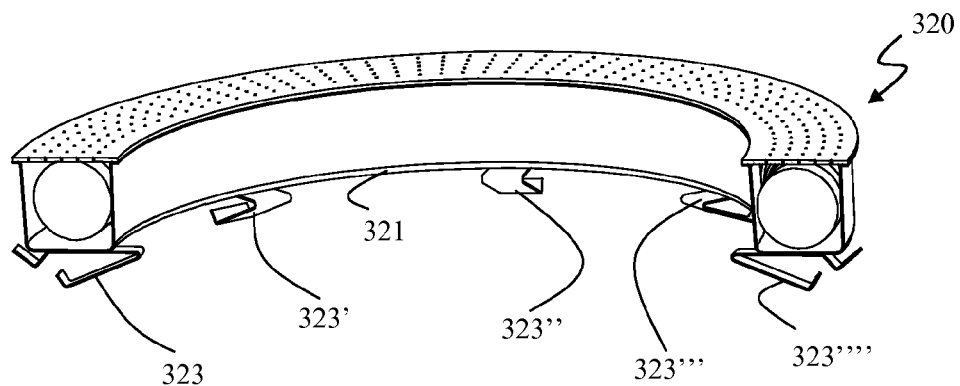
Figure 8A:
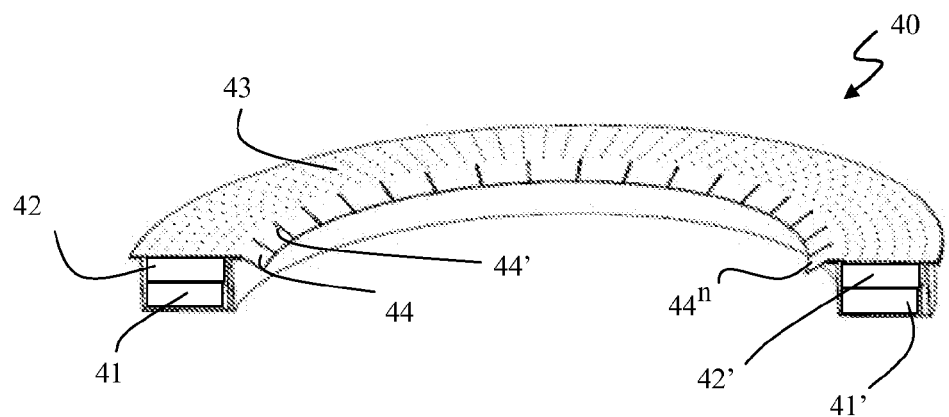
Figure 8B:
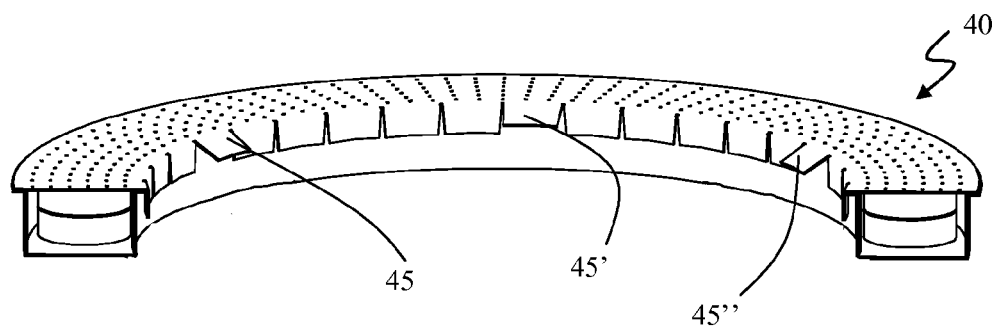
Figure 9:
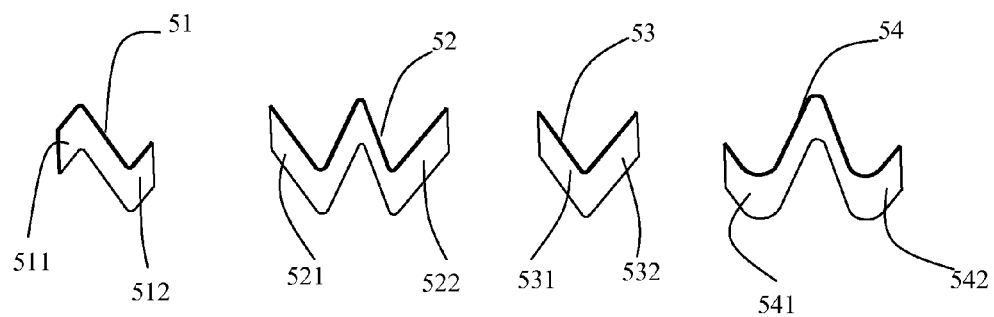
Figure 10:
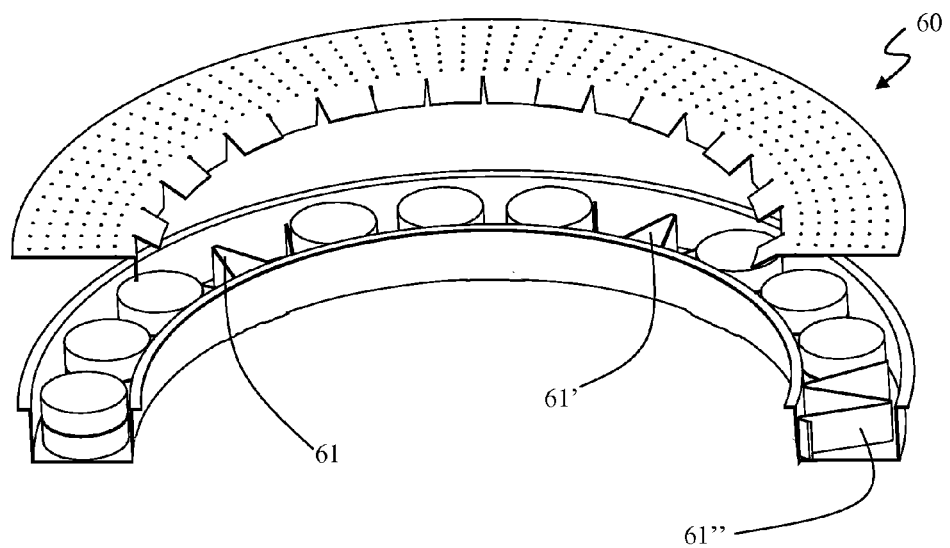
Figure 11:
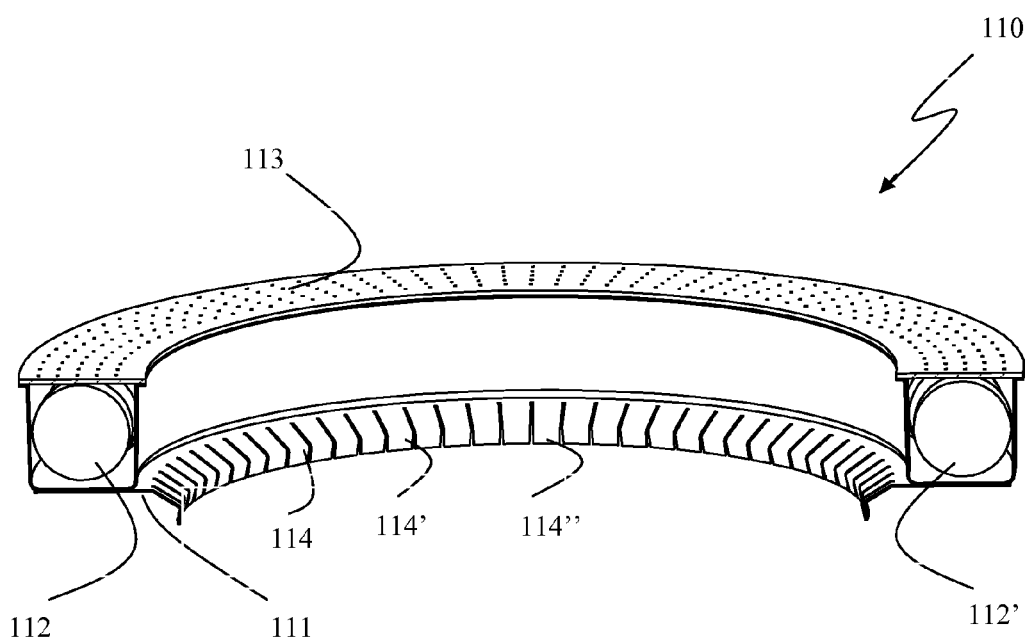

The invention will be further illustrated with the help of the following figures, wherein:

FIG. 1 shows a schematic representation of a view from above of a getter system for receiver tubes according to the present invention, FIG. 2 shows the cross-section II-II of FIG. 1, FIG. 3 shows an alternate embodiment of the getter system shown in FIG. 1, FIGS. 4 and 5 show cross-sectional views of the embodiment of FIG. 2 with two alternative getter material pills dispositions, FIGS. 6 and 7 show two different embodiments of anchoring means to the central tubular element for the getter systems in the receiver tubes according to the present invention, FIGS. 8A and 8B respectively show two different placements of a further anchoring means embodiment, FIG. 9 shows some possible embodiments of elastic means for use inside the getter systems, FIG. 10 shows a getter system comprising elastic means in contact with the getter material pills, FIG. 11 shows an alternate preferred embodiment of a getter system according to the present invention.

Figure 12:
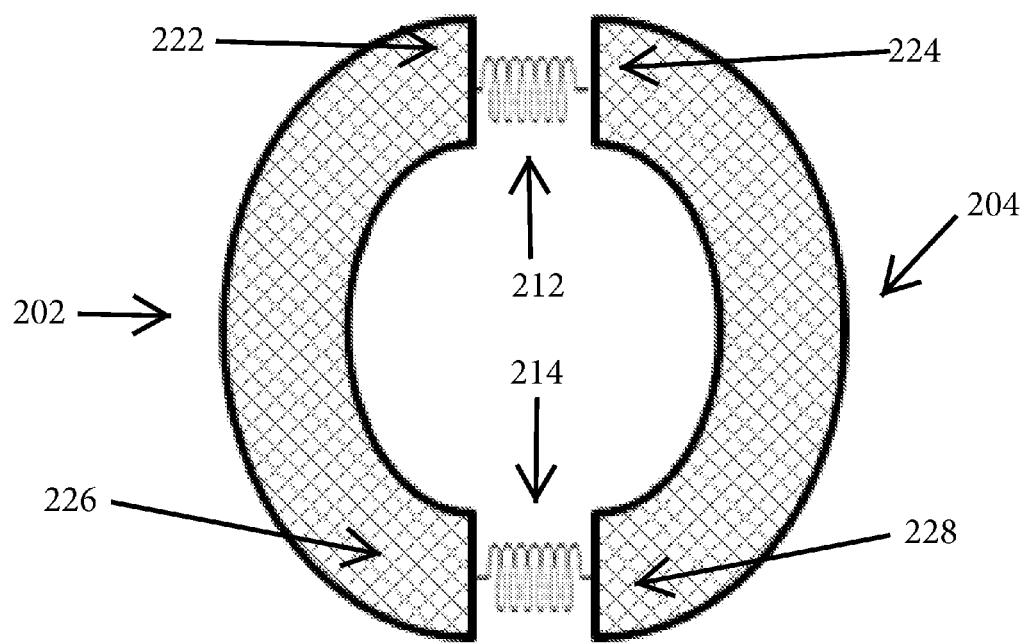

FIG. 12 shows an alternative embodiment of a getter system comprising springs.

In the figures the dimensions and dimensional ratios of the elements, with particular and non exclusive reference to the size of the meshes of the containment net or to the pills of compressed getter material powders, could be altered to improve the comprehension of the invention. Moreover, elements optionally present such as, for example, soldering points or constraints for the containment net, as well as the constituting elements of a receiver tube, have not been depicted since not essential for the invention comprehension.

One of the problems present with the getter materials used in form of pills of compressed powders, especially when used for hydrogen removal from the internal volume of sealed devices, such as in the case of solar collectors receiver tubes, is linked to the swelling phenomenon as a consequence of the absorption of significant hydrogen levels that is also concurrent with an embrittlement phenomenon of the pill structure due to hydride formation. The occurrence and intensity of these phenomena are not easily foreseeable a priori, since they are determined by the gaseous load. The observed problem is that even before the getter material pills capacity is exhausted, the above mentioned phenomena lead to a progressive pill disaggregation with consequent generation of getter material powders.

Some of the getter systems employed in the solar collector receiver tubes envision means to retain powders, however these means are typically dimensioned in such a way to retain a fraction of detached powders, for example as a consequence of the pills positioning in their housing support. Such means are not efficient when there is an excessive powder generation as a consequence of the pills disaggregation. In particular when net structures are used, the meshes are subject to clogging phenomena (known with the English term clogging) if they are sufficiently tight to retain all the powders granulometries that may detach from the pill structure, thus compromising the getter system capacity to remove gasses before the exhaustion of the getter material capacity therein present. On the opposite, if the meshes are dimensioned to retain only the powders with the biggest granulometry, the finer powders will disperse inside the container, thus creating different types of problems, among which the transparency loss of the internal surface of the external tubular element is the most evident and noxious.

The latter type of solution is described in the International patent application WO 2010/144930 dealing with the problem of powder confinement but not addressing ways to avoid the powder generations, taking into account that in the main and preferred embodiment of this patent application the getter materials are used in the form of powders. Similar consideration applies also to the aforementioned WO 2011/039281, that also does not describe or disclose the possibilities and advantages deriving from the use of a container having a toroidal geometry.

The inventors have determined that, differently from the known art, the use of a getter system with a support having a substantially toroidal shape offers various advantages, in particular an easier mounting in a solar collector, a higher flexibility offered by said geometry with respect to its fixing and the possibility of adapting the same solution to different types of receiver tubes (molten salts or diathermic oils) by adopting minimal structural variations of the getter systems.

Moreover, a getter system with a substantially toroidal geometry shows also secondary advantages linked to the disposal of the receiver tubes or to re-processing needs because of defects which are spotted during the manufacturing process. In fact in both cases it is necessary to recover the getter systems. A standard getter system made according to the known art, i.e. with a linear geometry (for example a sledge), soldered onto the central tube, is difficult to recover by keeping it integral in its structure or functional properties during its removal from the receiver tube. This known system, during the disposal operations of an exhausted receiver tube, leads to the generation of getter material powders that for ambient impact and safety reasons need to be collected by means of a suitable aspiration system. On the other hand, in case of receiver tube re-processing, there are both the risk of an irreversible damage to the getter system and in any case a phenomenon of powders generation, even though this is less marked than in the case of an exhausted tube. A system with a substantially toroidal geometry allows instead to recover the getter system without damaging it, which system can be more easily disposed in case of exhausted tubes or re-employed in case of tube to be re-processed.

Moreover, as it will be described in the following, the substantially toroidal geometry allows to address more efficiently the problem of the correct getter material temperature inside the getter system.

A first embodiment for the getter material support according to the present invention is shown in a schematic representation of a view from above in FIG. 1, and in a cross-section along axis II-II in FIG. 2. The metallic container of the getter system 10 has a substantially toroidal shape, on which base 11 getter material pills 12, 12', 12" are disposed. Base 11 is solid, as solid are the parts that define the toroid height, i.e. internal wall 13 and external wall 14 of the container, that is closed on top by suitable containment means 15, that in the most common case, such as the one shown in FIGS. 1 and 2, comprise a metallic net to contain powders that could possibly detach from the pills of getter material. Said metallic net typically has holes with openings comprised between 0,05 and 0,2 mm. The cross-section of FIG. 2 shows the possibility that the container houses more overlapped rows of pills, indicated with pairs 12, 22 and 12', 22'. In case of circular holes the values previously given refer to their diameter, otherwise to the maximum dimension of the net openings.

An alternative and equivalent embodiment envision as containment means a closed metallic strip that has openings in which a metallic net or equivalently a porous septum is present, or the metallic strip is completely closed but its width is wider with respect to the toroid corona, defined by the width of base 11 or equivalently by the distance between walls 13 and 14. This latter type of realization is shown in FIG. 3 in its schematic representation of the cross-section view with respect to axis II-II. In this case a slit 16 running alongside the circumference of the container is arranged between the containment means 17 and one wall of the container, more specifically internal wall 13. The width of slit 16 is comprised between 0,05 and 0,2 mm, so as to retain getter material powders that detach from the pills and at the same time allowing the getter material to remove gaseous species, with particular reference to hydrogen, from the internal atmosphere of the receiver tube.

In order not to impair the getter system functionality it is necessary that the getter material pills do not lose an excessive powder fraction, so that the solution described in the present invention allows to slow down as much as possible their formation, essentially by employing a solar collector receiver tube that contains a getter system with substantially toroidal geometry, that houses pills of getter material, wherein the width of the toroidal container cross-section (i.e. the distance between lateral walls 13 and 14, as previously illustrated as example in FIGS. 1-3), is slightly wider than the lateral encumbrance, namely in the sense of the toroid corona width, of the getter material pills. In particular the cross-section width of the container is comprised between $1,05*i$ and $1,2*i$, where i represents the overall lateral encumbrance (that takes then into account the possibility to have more aligned rows) of the getter material pills. An excessively narrow cross-section of the container would lead to stresses in the pills structure as a consequence of their swelling, while an excessively wide cross-section would lead to an undue encumbrance of the container and to the possibility of pills fragmenting by hitting the container walls during the getter system shipment or installation in the solar collector, thus causing both powders generation as well as an increase in the number of powders sources.

The determination of such width values if by far not simple, since it should take into account phenomena that are not easily observable with a "fresh" getter system, i.e. a newly activated system or a system not yet exposed to meaningful $H_2$ loads. Such phenomena are instead observable only after the system has absorbed a significant amount of hydrogen, taking also into account the specific requirements of the application with regards to particle loss and expected life of the device, that should be at least 10 years.

There are essentially three possibilities to dispose the pills within the container. The first way is depicted in FIG. 1, in which the pills are horizontally laid on base 11 of the container, i.e. the axis of the getter material (cylindrical) pills is substantially parallel to the axis of the toroidal container. In this case, assuming that all the pills have the same diameter, the lateral encumbrance i is substantially coincident with the diameter d of the getter material pills 12, 12', 12".

As previously described, in this case it is also possible to arrange more rows of getter material pills one on the other, such as the example shown in FIG. 2, where two layers of overlapped pills are present, the first layer comprising pills 12, 12' and the second layer comprising pills 22, 22'.

In particular, as shown in FIGS. 1 and 2, the upper part 15 that closes the container, even though not being full and therefore exerting a lesser force onto the swelled pill, could as well lead to the same phenomenon of uncontrolled powder generation due to hydrogen sorption, so that it is preferable that also the container height is determined according to the height h of the cylindrical pills and to the number n of overlapped pills layers. In particular the container height is advantageously comprised between $n*h*1,05$ and $n*h*1,2$.

FIG. 4 shows a cross-section view of a toroidal container 20 according to the present invention, in which however the cylindrical pills 22, 22' are vertically disposed, in which their axis is substantially orthogonal to the container axis and does not intersect it.

In this type of arrangement, in case all the pills have the same diameter d, the lateral encumbrance i is given by the diameter of the getter material pills. In this case the preferred embodiment envisions a container with a height comprised between $1,05*d$ and $1,2*d$.

FIG. 4 shows a closure 25 by means of a perforated mesh, however it is possible to adopt a different closure element for the container that is absolutely equivalent from a functional point of view (namely it allows an access to the getter material of the gas to be removed and a powders retaining action), as a non limiting example the typology shown in FIG. 3, i.e. a full strip 17 that leaves a slit 16 running alongside a toroidal container edge of the getter system.

Similarly FIG. 5 shows a container 30 of the above mentioned type, that comprises rows of getter material pills 32, 33, vertically disposed, wherein their axis is substantially orthogonal to the container one, but in this case the pills axis intersects the container axis. In this disposition the lateral encumbrance i, in case of pills having the same height h, is given by height h multiplied by the number of pills layered alongside in one row between the lateral walls of the container.

In a further preferred embodiment, particularly useful in case of receiver tubes using diathermic oils, the container is formed by parts made of at least two different materials that exhibit a different emissivity $\epsilon$. In particular the container is made of materials with low emissivity, meaning $\epsilon \leq 0,2$, together with materials with a high emissivity, meaning $\epsilon \geq 0,8$, wherein the low emissivity material is employed to make parts or components of the container facing the regions of the receiver tube at the lowest temperature, i.e. those parts not facing the central tube, such as, for example considering FIG. 1, the external wall 14. For the same reason, internal wall 13 is advantageously made of a high emissivity material. However, this type of solution could be advantageously used also for solar collector receiver tubes with different geometries, such as the one described in U.S. Pat. No. 6,832,608, also in this case by using low emissivity materials for the sledge portion containing the getter material pills, which portion faces the external tubular element.

There are different possibilities to fasten the getter system within the receiver tube, among which particularly advantageous is the use of a substantially toroidal metallic structure provided with elastic anchoring means to restrain the container to the central tube.

To have an efficient fastening it is necessary for the anchoring means to be at least three, preferably equally spaced among each other in order to better distribute the load onto the central tube. Moreover said anchoring means are preferably flexible, i.e. capable of deforming to restrain the container to the central tubular element of the receiver tube. The term flexible means both elastic elements, i.e. capable to return to their shape if the container is removed from the central tubular element, as well as elements that are irreversibly deformed as a consequence of the mounting operation.

Two possible embodiments are shown in FIGS. 6 and 7. FIG. 6 shows a cross-section view of a getter system 310 according to the present invention, that houses getter material pills 312, 312' vertically disposed. Anchoring elastic means 313, 313', 313" in form of hooks are fixed onto base 311 of container 310. A getter system made according to the embodiment of FIG. 6 has four anchoring points, three of them being shown in the figure.

An alternate and absolutely equivalent embodiment is shown in FIG. 7, in which base 321 of the getter system 320 has eight anchoring means, five of them 323, 323', 323", 323''', 323'''' being shown in the figure in form of metallic deformable strips.

The preferred way, for practical and efficiency reasons, to fix the anchoring means to the container is by soldering.

An alternate and particularly advantageous solution is the one depicted in FIGS. 8A and 8B, wherein the getter system 40 contains two getter material pills layers 41, 41', 42, 42', horizontally disposed (this is completely equivalent in case the pills are disposed vertically). The perforated cover 43 of the container extends toward the interior and presents substantially radial cuts that define a plurality of metallic fins 44, 44', 44". In this case, all the fins that are not bent will become anchoring means to the central tubular element, as shown in FIG. 8b, where fins 45, 45', 45", which are not bent, become anchoring means of the toroidal getter system to the central tubular element of the receiver tube.

In a particular embodiment said anchoring means present a good thermal conductivity, namely a thermal conductivity higher than or equal to 50 W/m° C. This type of solution is particularly advantageous when solar collector receiver tubes at moderate working temperature are employed, such as the ones using diathermic oils as cooling fluid.

An opposite embodiment envisions instead the use of anchoring means with a low thermal conductivity, namely a thermal conductivity less than or equal to 20 w/m° C. This type of solution is advantageous in solar collector receiver tubes at high working temperature, such as the molten salts receiver tubes.

It has to be underlined that the substantially toroidal container of the getter system can be provided with additional anchoring means to improve its fixing, which means are useful for example during the installation and mounting phases of the receiver tubes of the plant. These additional anchoring means constrain the getter system container to different elements with respect to the central tubular element, by typically interfacing with the external tubular element or with the variable length element for the compensation of the different thermal dilatation.

A further improvement of the system according to the present invention envisions the advantageous use of one or more elastic elements inside the container, in direct contact with the getter material pills.

The main function of these elastic elements is to exert a compression force on the pills by pushing them against each other. This ensures that the pills, that as previously described are housed in a substantially toroidal container slightly bigger with respect to their dimensions, are restrained by the compressive force exerted by the elastic elements.

Moreover the elastic elements create within the container regions free from getter material. Therefore such elastic elements allow, thanks to their compression, to compensate the volume increase of the getter material pills due to hydrogen sorption, thus further reducing the powder generation phenomenon as a consequence of intra-pill stresses. The force exerted by the elastic elements is advantageously comprised between 50 and 150 N, so as to ensure a good blocking action of the getter material pills within the container and at the same time to compensate, thanks to their compression, the volumetric expansion of the getter material pills due to $H_2$ sorption. The determination of such elastic force value is furthermore extremely critical, since an excessive compression would lead to the pills breakage, and is by far not easy, since it should take into account that the pill resistance varies with time as a consequence of the embrittlement due to hydrogen sorption.

The elastic elements should also be free of edges in the contact region with the pills in order to avoid preferential powders generation points, so that they should preferably be flat or rounded. This characteristic will be referred to in the following as distributed contact. FIG. 9 shows some examples of elastic elements 51, 52, 53, 54 suitable to be employed in the getter systems of the solar collector receiver tubes according to the present invention. It can be observed that portions 511, 512, 521, 522, 531, 532, 541, 542 that must be put in contact with the getter material pills are flat or rounded, so as to achieve a distributed contact with the pill surface.

FIG. 10 shows a getter system 60 similar to the one depicted in FIG. 8B, wherein elastic elements 61, 61', 61" are present inside the container.

Obviously this type of solution is applicable to any of the possible getter system with substantially toroidal geometries previously described. For example the getter material pills could be positioned vertically rather then be positioned horizontally on two overlapped rows, so as the anchoring means may alternatively be hooks similar to elements 313 or 323 shown in FIGS. 6 and 7, as well as a particular embodiment foresees the presence of both hooks or elastic anchoring means fastened to the base of the container and fins on its cover to have an anchoring that exerts a force onto the central tubular element that is, as much as possible, distributed.

The elastic elements could also be used to keep a portion of the container free of getter material, in which case it is required for only the terminal part of these elements to exhibit the geometrical (distributed contact) and elastic characteristics previously described.

When the elastic elements are used to keep a portion of the container free of getter material, it is useful that the getter material occupies between 40% and 80% of the available volume.

Finally, a last embodiment that may be particularly advantageous is the one shown in FIG. 11. In this case the getter system 110 houses a series of getter pills 112, 122' vertically disposed, placed onto base 111. The upper portion of the getter system is made by a perforated cover 113. Base 111 presents a series of fins 114, 114', 114," some of which, according to the specific type and structure of the solar receiver, may be bent or left as they are to become anchoring means as well as means to increase the temperature of the getter material owing to their thermal conductivity.

In a final aspect the invention is inherent to solar collector receiver tubes comprising containers consisting of two elements having a substantial semi-toroidal shape and coupled to each other. The most useful way to couple the two semi-toroids is through elastic means, for example springs, positioned at their extremities. This type of solution simplifies the installation procedures of the getter system within the receiver tube. FIG. 12 illustrates an exemplary embodiment of a container having two elements 202, 204 each with a semi-toroidal shape, coupled through elastic means, for example springs 212, 214 at the extremities 222, 224, 226, 228 of the two facing containers. Each of the two elements may be, for example, in the shape of the container of FIG. 11.

A further embodiment, also aimed to the simplification of the installation procedures of the getter system within the receiver tube, foresees the use of a container with a substantially toroidal shape, interrupted in at least one point, i.e. it is not closed over itself but exhibits at least two closed extremities, facing each other. Said container is made with a metallic material with good elastic properties and has an elastic pulling system at the closed container extremities.

Finally, for what pertains to the getter materials, the ones having a good hydrogen sorption property also when employed at high temperatures are preferred. For this reason preferred getter materials are for examples the ones described in U.S. Pat. No. 3,203,901 (Zr—Al alloys), U.S. Pat. No. 4,306,887 (Zr—Fe alloys), GB patent 2,077,487 (Zr—V—Fe alloys), U.S. Pat. No. 5,961,750 (Zr—Co-Rare Earths alloys). For the sorption of hydrogen, especially at high temperatures, it is also known the use of yttrium based alloys, such as described in the International patent applications WO 2007/148362 and WO 2007/099575, and also in the International patent application WO 2010/105945. These are the preferred getter alloys, but any getter material for hydrogen may be employed with the inventive concept described hereinabove.

The invention claim is:

1. A solar collector receiver tube comprising:
   at least one central tubular element arranged in an external tubular element;
   at least one element with variable length for compensating a different thermal expansion of said two tubular elements; and
   at least one getter system comprising a container that houses cylindrical pills of compressed powders of getter material, the container having an inner wall and an external wall, wherein the cylindrical pills are disposed in the container between the inner wall and the external wall,
   wherein said container is substantially toroidal-shaped and is arranged around the central tubular element, the cross-section of the container having a width comprised between 1.05*i and 1.2*i, wherein i is a lateral overall dimension of each cylindrical getter material pill in the container cross-section, and
   wherein said container is void of other materials between the cylindrical pills and the container walls.

2. The receiver tube according to claim 1, wherein said cylindrical getter material pills are arranged with their axis substantially orthogonal to an axis of the container, a height of the container being comprised between 1.05*d and 1.2*d, where d represents a diameter of the cylindrical getter material pills.

3. The receiver tube according to claim 1, wherein said cylindrical getter material pills are arranged with their axis substantially parallel to an axis of the container.

4. The receiver tube according to claim 1 wherein a height of the container is comprised between n*h*1.05 and n*h*1.2, where h is a height of the cylindrical getter material pills and n is a number of layers of stacked pills.

5. The receiver tube according to claim 1, wherein an upper portion of the container comprises at least one perforated element chosen from a metallic mesh, a porous septum and/or a perforated sheet, wherein holes of this perforated element have openings comprised between 0.05 mm and 0.2 mm.

6. The receiver tube according to claim 1, wherein an upper portion of the container comprises a closed metallic part that forms a slit with a width comprised between 0.05 mm and 0.2 mm.

7. The receiver tube according to claim 1, wherein the container comprises portions made of a material having an emissivity lower than or equal to 0.2 and portions made of a material having an emissivity greater than or equal to 0.8, the portions with the lower emissivity being arranged by regions of the receiver tube which are at a lowest temperature.

8. The receiver tube according to claim 7, wherein portions with the lower emissivity comprise an outer wall of the container and/or the portions with the higher emissivity comprise an inner wall of the container.

9. The receiver tube according to claim 1, wherein said container is provided with anchoring means for fixing it to at least three points of the central tubular element.

10. The receiver tube according to claim 9, wherein said anchoring means are essentially equally spaced.

11. The receiver tube according to claim 9, wherein said anchoring means are flexible.

12. The receiver tube according to claim 9, wherein said anchoring means are obtained by bending metallic fins.

13. The receiver tube according to claim 9, wherein a working temperature of said receiver tube is not higher than 450° C. and said anchoring means have a thermal conductivity greater than or equal to 50 W/m ° C.

14. The receiver tube according to claim 9, wherein a working temperature of said receiver tube is higher than 450° C. and said anchoring means have a thermal conductivity lower than or equal to 20 W/m ° C.

15. The receiver tube according to claim 9, wherein the container is provided with additional anchoring means to constrain the container also to other constitutive elements of the receiver tube.

16. The receiver tube according to claim 15, wherein said constitutive elements comprise said external tubular element and/or said element with variable length.

17. The receiver tube according to claim 1, wherein said container includes one or more elastic elements in contact with the cylindrical getter material pills, wherein said elastic elements exert a distributed contact with a surface of the cylindrical getter material pills.

18. The receiver tube according to claim 17, wherein a percentage comprised between 40% and 80% of an internal volume of said container is devoid of getter material and said elastic means determine a portion devoid of getter material.

19. The receiver tube according to claim 1, wherein said container comprises two mutually coupled elements having a substantially semitoroidal shape, each of said two mutually coupled elements enclosing entirely a plurality of cylindrical pills.

20. The receiver tube according to claim 19, wherein said coupling is made by elastic means placed at extremities of said substantially semitoroidal-shaped elements.

21. The receiver tube according to claim 1, wherein said container is interrupted at least in one point and has at least two closed extremities facing each other, a traction elastic system being arranged at said closed extremities of the container.

* * * * *